INVENTOR.
Oscar U. Zerk
BY
ATTORNEYS

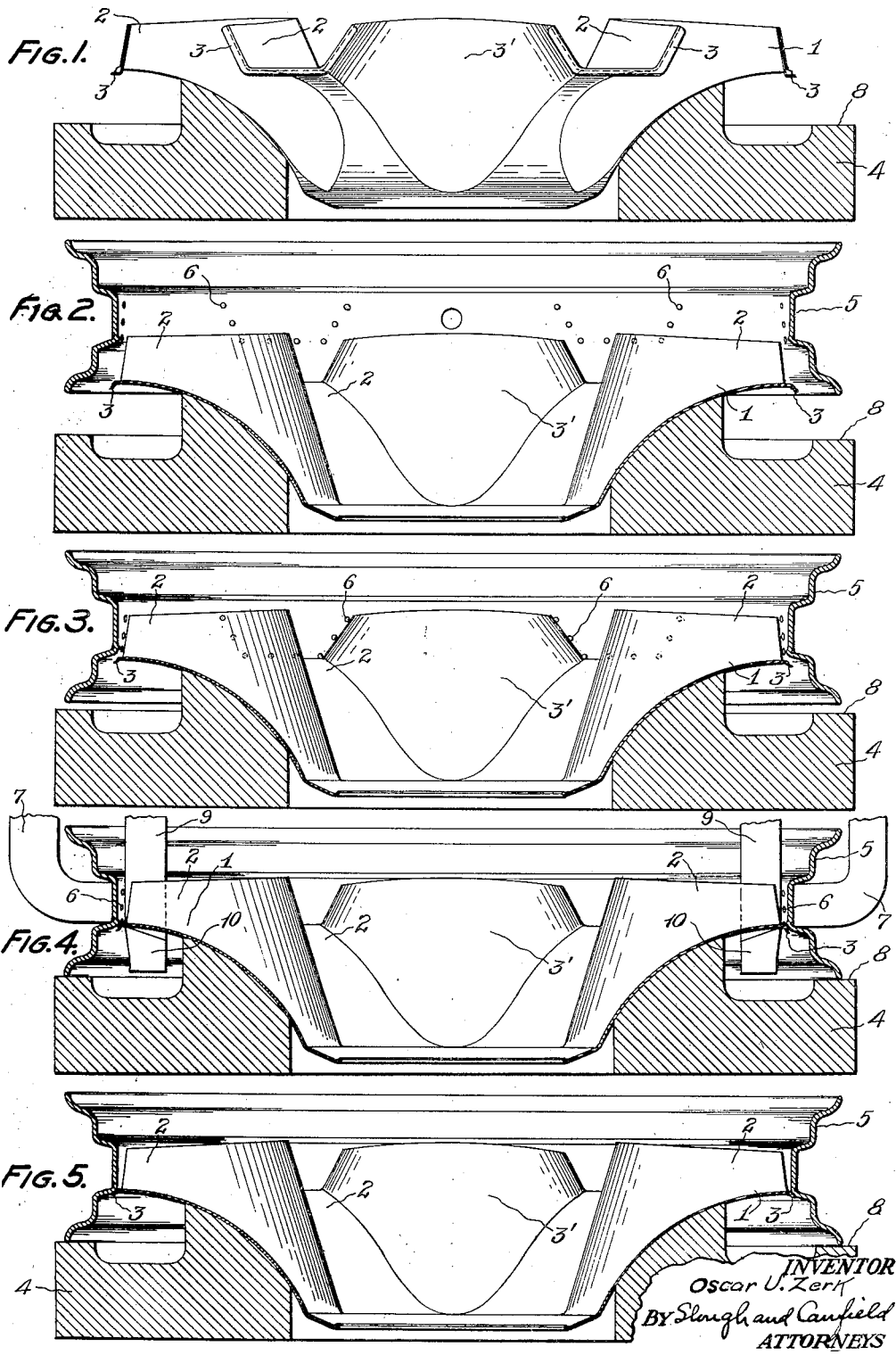

March 19, 1935. O. U. ZERK 1,994,557

METHOD FOR WELDING WHEELS

Filed Dec. 26, 1931 6 Sheets-Sheet 3

INVENTOR.
Oscar U. Zerk
BY
Slough and Canfield
ATTORNEYS

March 19, 1935.  O. U. ZERK  1,994,557
METHOD FOR WELDING WHEELS
Filed Dec. 26, 1931  6 Sheets-Sheet 4
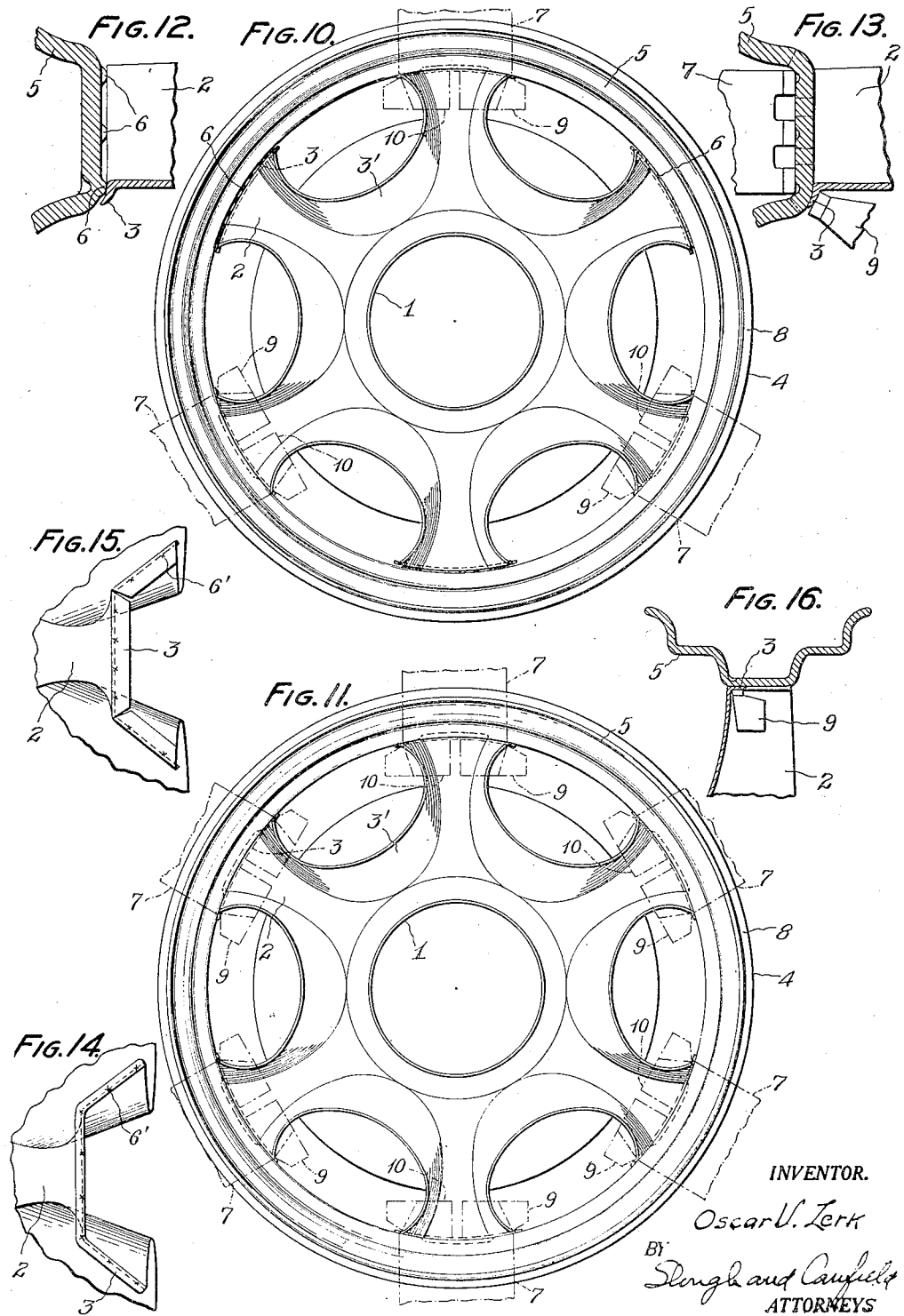

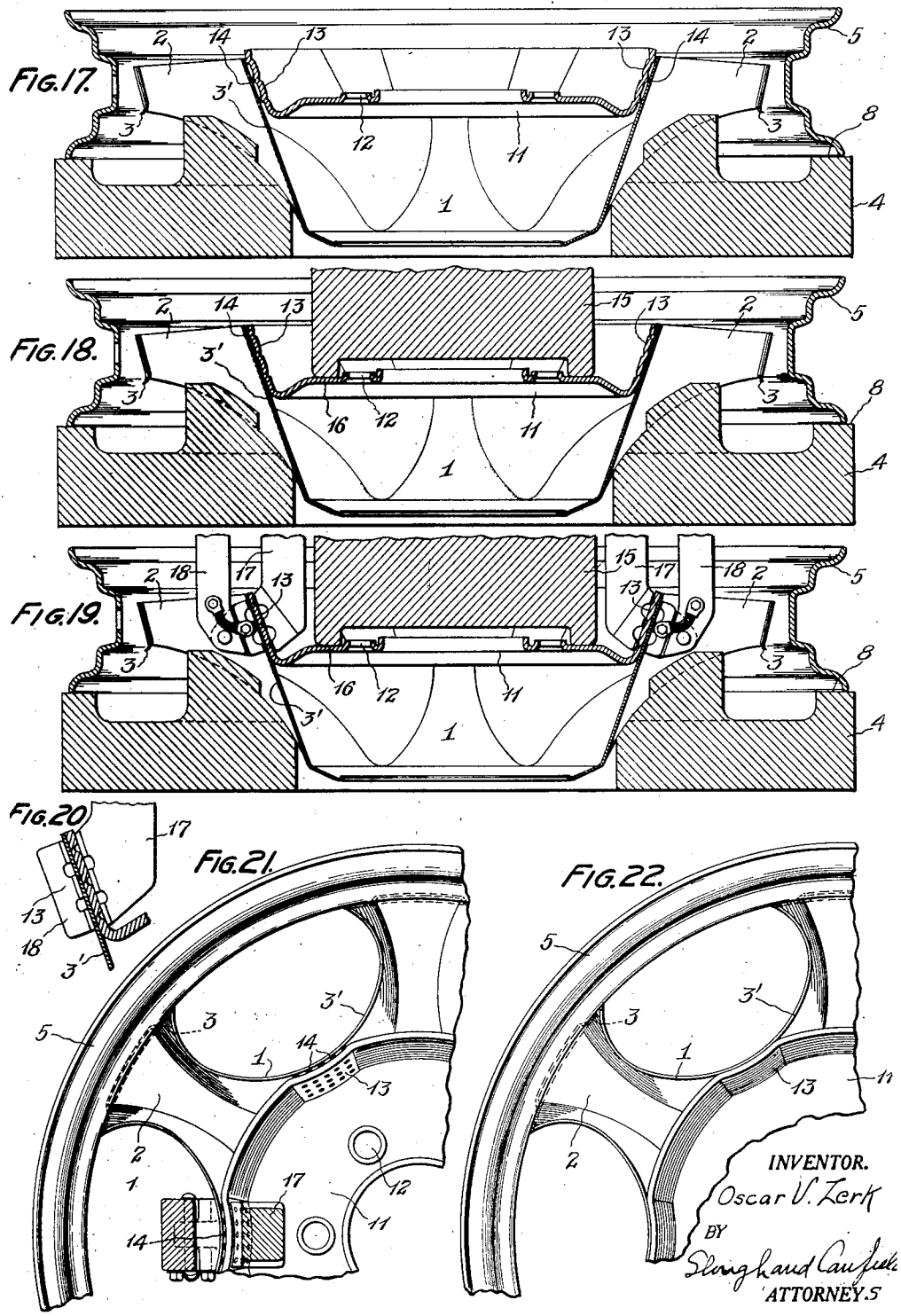

March 19, 1935. O. U. ZERK 1,994,557
METHOD FOR WELDING WHEELS
Filed Dec. 26, 1931 6 Sheets-Sheet 6

INVENTOR.
Oscar U. Zerk
BY
Slough and
Canfield
ATTORNEYS

Patented Mar. 19, 1935

1,994,557

UNITED STATES PATENT OFFICE 1,994,557

METHOD FOR WELDING WHEELS

Oscar U. Zerk, Cleveland, Ohio, assignor to Zerk Corporation, a corporation of Delaware Application December 26, 1931, Serial No. 583,333

7 Claims. (Cl. 29—159)

This invention relates to methods of making wheels.

Reference may be had to my copending application, Serial No. 656,480, filed February 13, 1933, disclosing a type of wheel produced by the herein described method.

While wheels made according to the method of this invention may be used on various kinds of vehicles and for other purposes, automobiles afford the largest field of use for such wheels. At the present time, automobile wheels are mostly of the wooden or the wire type. Wire wheels and wood wheels are made up of a large number of parts which complicates the manufacturing process and makes necessary a very large number of individual operations in the assembly of the wheel. While the many operations involved in the assembly of wire and wood wheels are being carried out, it is very difficult to maintain the rim of the wheel parallel with the plane of the wheel fastening flange. Accordingly, it is often necessary after such wire or wooden wheel is assembled to turn the edge of the wheel fastening flange which is to be engaged with the axle member in order that the wheel may turn without wobbling. Such present day methods of manufacture of wheels are relatively expensive in terms of the labor, time and the equipment required.

A wheel may be regarded as consisting of three essential parts, namely, a rim portion, a hub portion, and a spoke portion for connecting the rim and hub portion. In present day practices, the construction and method of assembly of the spoke portion of the wheel affords the greatest obstacle to economical and efficient manufacturing method. Accordingly, I propose to replace the multi-part spoke portion of the present day wheel by a single piece of sheet metal spoke portion adapted to improved methods of manufacture.

In order to eliminate the use of additional parts and to render the steps of uniting the parts of the wheel together as simple as possible, welding is employed for securing those parts together. In order to effect a secure union between the sheet metal parts of the wheel in rapid production method, it is desirable to have the parts under compression at the face of the weld so that a good electrical contact will be made between the parts, and so that after the weld has been completed the strain upon the welded joint will be one of compression rather than one of tension.

One effective method of creating a tension between the ends of the spokes of the spoke unit and the rim is to make the spokes of a larger outside diameter than the inside diameter of the rim. The spoke unit is made of a shape to provide resiliency and is pressed into place within the rim thereby creating a force of compression between the ends of the spokes and the inner surface of the rim due to the resiliency and over-size of the spoke unit.

In order that the union between the parts of the wheel may be made as secure as possible, it is desirable to effect a weld over a large area. In order to insure a good weld over a large area, it is desirable to present a number of points of contact between the parts to be welded over such an area.

A plurality of points of contact may most readily be formed by forming projections in at least one of the surfaces of the welding area. The resiliency of at least one of the parts, such as the spoke unit, provides a pressure at the inner face of the weld insuring a good contact between the projections on one of the parts and the surface of the other part.

In order that the weld may be a secure one, it is desirable that both parts involved in the weld be brought to approximately the same temperature during the welding operation at the interface of the weld. Where the two parts involved have different capacities to dissipate the heat therefrom, there is a tendency for the part, which has the least capacity to dissipate heat, to burn without forming a union with the other parts.

Inasmuch as, in wheels intended for use on automobiles, it is desirable to have a minimum of weight consistent with strength, and, inasmuch as it is desirable to save material in the interest of economy, the spoke unit of the wheel is made as light as possible consistent with the necessary strength. Accordingly, the metal of the spoke unit is lighter than the metal of the rim. This relative distribution of the weight of the metal in the wheel is in accordance with the requirement of the strains placed upon the parts of the wheel.

Therefore, it is apparent that, in welding together a spoke and the rim, the tendency would be for the spoke to heat up too much and the rim part to heat up not enough. Since it is desirable to use projections upon at least one of the parts for reasons heretofore pointed out, and since that part having the projections will have a reduced capacity to dissipate heat because of the presence of the projections, it is desirable to place the projections in the metal of the rim. By thus forming the projections in the metal of the rim, the capacity of the rim to dissipate away the heat is reduced so that it is more comparable with the capacity of the spoke to dissipate away the heat; and accordingly, the two parts, at the inner face of the weld, attain more nearly the same temperature and a more effective weld is obtained.

Since the spoke unit is of relatively thin sheet metal, and since it is desirable to have a good and large area of contact at the inner face of the weld, it is desirable to so form the end of the spoke so that a lateral face will be presented as a welding inner face. One of the ways in which this may be accomplished is by bending over a small margin at the end of each spoke into such a position that, when the spoke unit is in welding position within the rim, the bent-over margin of the spoke will present a face to the projections formed in the metal of the rim, which will be parallel to the adjacent surface of the rim from which the projections extend. Thus a large area for welding purposes is presented.

By arranging such bent-over marginal portion of the end of the spoke parallel with the adjacent portion of the rim, the welded joint will not be subjected to bending stresses tending to crystallize the metal and break the welded joint. Since the projections formed in the metal of the rim are vertically upstanding therefrom, in the most desirable form of the invention, the bent-over marginal ends of the spokes extending in a direction perpendicular to the axis of the projections which arrangement is most effective in making a good weld.

In order to complete the wheel, it is necessary to provide a member for attaching the wheel to the axle of the car. Such a member, which I shall refer to as the wheel attaching flange, is formed by pressing from sheet metal. It is desirable to attach the wheel attaching flange to the spoke unit by welding. In order that the two parts may be securely welded in rapid production operation, it is desirable that a large area of weld be formed on the parts, that the parts be welded under compression with even pressure of contact existing between the two parts all over the welding area, and also that during the welding operation the metal of the two parts at the inner face of the weld reach approximately the same temperature approximately simultaneously.

This may be accomplished by forming in the central portion of the spoke unit a conical surface, and by forming upon the wheel attaching flange a corresponding conical surface adapted to inter-fit with that surface of the spoke unit.

When the wheel attaching flange is pressed into the conical portion of the spoke unit, the resiliency of the spoke unit provides a compressional force acting at the inner face of the contacting part.

Since by the necessity of the construction of the wheel, the wheel attaching flange is of heavier sheet metal than the material of the spoke unit, it is necessary to provide means for reducing the capacity of the wheel attaching flange for dissipating heat more rapidly than is the case with the spoke unit. Also, it is desirable to provide a plurality of points of contact between the metal of the wheel attaching flange and the metal of the spoke unit; accordingly, the projections are formed in the metal of the wheel attaching flange extending outwardly and vertically from the surface thereof. Such projections are adapted to contact with the inner surface of the cone of the spoke unit at a plurality of points, the axis of the projections being at right angles to the plane of the conical surface of the spoke unit at the point of contact.

The projections in the metal of the wheel attaching flange reduce its capacity for dissipating heat so that, during the welding operation, the metal of the two parts be more approximately the same welding temperature.

It is desirable to have an even pressure between the point of contact of the metal of the wheel attaching flange and of the spoke unit.

One effective way of accomplishing this object is by arranging the projections on the metal of the conical portion of the wheel attaching flange in such manner that those projections most distant from the axis of the cone are the larger and those projections nearest the axis of the cone are the smaller, the projections having gradations of size between those two limits.

As described above, the sheet metal spoke and outer hub member due to its peculiar form, is so very resilient, that the extreme outside diameter of the spoke portion can easily be reduced one-quarter of an inch or more, since the spoke and outer hub member is of conical form instead of the straight or planular form which has been used so far in the design and manufacture of sheet metal wheels. A planular sheet metal member cannot be reduced in diameter without permanently distorting its form. By the use of my above described novel tapered or conical design of the sheet metal spokes, the following temporary distortion can take place:

The extreme outside diameter of the spokes and the inwardly situated outer hub portion between the spokes is reduced while the outside diameter of the outwardly situated portion of the outer hub remains the same but moves outwardly in the direction of the axis of the wheel. If the inwardly directed pressure against the outer ends of the spokes should be relieved, the resilient spokes and outer hub member would always spring back to its original form. The same kind of temporary distortion could also be accomplished by applying pressure parallel with the axis of the spoke and outer hub member against the extreme ends of the spokes towards the inwardly situated end of the spoke and outer hub member, and against the outwardly situated portion of the outer hub in an outwardly pointed direction.

In carrying out the principles of my invention, I weld a radially compressible spoke and outer hub member to the inside of a rim or felloe in such a manner that the outside diameter of the spoke and outer hub unit which before assembling in the rim or felloe is larger than the inside diameter of the rim or felloe is reduced in diameter after the welding operation is completed, and also weld the radially compressible spoke and outer hub member to the inside of a rim or felloe in such a manner that two radial contracting operations and one expanding operation take place as follows:

1. Before welding the outside diameter of the spoke and outer hub member is contracted to the inside diameter of the rim or felloe.

2. Before welding the outside diameter of the spoke and outer hub member is further contracted to the inside diameter of projections placed inwardly of the rim or felloe.

3. During welding the outside diameter of the spoke and outer hub member is increased substantially to the inside diameter of the rim or felloe.

By employing a rim and a wheel fastening flange both of relatively heavier thickness, and a spoke and outer hub unit of relatively thinner thickness situated between the two other members, the resilient spoke and outer hub member permits a radial contraction at its circumference of the spokes and a radial expansion of the outer hub member between the spokes whereby the circumferential ends of the spokes are first welded to the rim and the outer hub portion between the spokes is then welded to the wheel fastening flange.

By this construction, when the conical portion of the wheel attaching flange is pressed into the conical portion of the spoke unit, the conical portion of the spoke unit will, by reason of its resiliency, spread slightly until all points of contact of the projections press evenly against the surface of the conical portion of the spoke unit.

It is an object of my invention to provide a novel method of wheel manufacture which will reduce the number of parts involved in the wheel, the number of operations involved in the assembly of the wheel, the time involved and the labor involved.

Another object of my invention is to provide a method for the manufacture of wheels from three pieces of sheet metal.

Another object of my invention is to so bring together the parts of the wheel as to place them under compression prior to the welding.

Another object of my invention is to prepare welding surfaces having a large number of points of contact upon those portions of the wheel units to be welded together.

Another object of my invention is to provide a welding interface between a sheet metal spoke part of a wheel and another part thereof, one of said parts providing a plurality of points of contact and the inter-face being under pressure due to the resiliency of the parts.

Another object of my invention is to so form the spokes of the wheel of my invention of sheet metal disposed in such a way that a lateral face will be presented as a welding inner face, whereby a good and large area of contact at the inner face of the weld may be secured.

Another object of my invention is to make provisions in the spoke unit and correspondingly in the wheel attaching flange for welding the two parts together.

Another object of my invention is to provide a spoke unit having inherent resiliency and of such form as to receive the wheel attaching flange under pressure and to provide even contact.

Another object of my invention is to so relatively arrange and construct the wheel attaching flange and the spoke unit so that the two will reach approximately the same temperature at the inner face of the weld.

Another object of my invention is to so construct and arrange the parts as to provide an even pressure between the point of contact of the metal of the wheel attaching flange and of the spoke unit.

Another object of my invention is to provide supporting means and the method for using the same, adapted to maintain the parts in proper relative positions during the assembling and welding operation.

Another object of my invention is to so support the rim and the wheel attaching flange relative to one another during the welding operation as to maintain those parts in the same plane, or parallel plane.

Another object of the invention is to present the welding electrodes to the parts to be welded with a pressure vertical to the surface thereof.

Another object of the invention is to apply welding pressure over an area smaller than the area to be welded.

Other objects and advantages of the invention will be apparent in the following details of description taken in connection with the accompanying drawings, in which:

Fig. 1 is a view partly in elevation and partly in section, showing a formed spoke unit carried in a supporting tool;

Fig. 2 is a view similar to Fig. 1, showing in addition the rim being arranged relative to the spoke unit;

Fig. 3 is a view similar to Fig. 2, showing a further step in the relative arrangement of the rim and spoke unit;

Fig. 4 is a view similar to Fig. 3, showing a still further step in the relative arrangement of the rim and spoke unit;

Fig. 5 is a view similar to Fig. 4, showing the spoke unit and rim welded together;

Fig. 10 is a view similar to Fig. 9, showing the spoke unit and rim being welded together at three points simultaneously;

Fig. 11 is a view similar to Fig. 10, showing all six spokes being welded to the rim simultaneously;

Fig. 12 is a detailed view in elevation showing the contact between the extremities of the spoke and the rim before welding;

Fig. 13 is a view similar to Fig. 12 after welding has been accomplished;

Fig. 14 is a detail view of the end of a spoke showing the outwardly turned flange;

Fig. 15 is a detail view similar to Fig. 14 showing an inwardly turned flange;

Fig. 16 is a detail view showing the application of a welding tool where the spoke unit has an inwardly turned flange;

Fig. 17 is a view partly in elevation and in section, showing the first step in the assembly of the wheel attaching flange and the spoke unit;

Fig. 18 is a view similar to Fig. 17, showing the next step in the assembly of the wheel attaching flange and the spoke unit;

Fig. 19 is a view similar to Fig. 18, showing the welding operation in the assembly of the wheel attaching flange and the spoke unit;

Fig. 20 is a detail view showing a welding operation of the wheel attaching flange and the spoke unit;

Fig. 21 is a broken-away plan view showing the assembled rim and spoke unit together with the wheel attaching flange before welding;

Fig. 22 is a view similar to Fig. 21 after welding has been completed;

I will now refer to the different figures of the drawings in all of which like parts are designated by like reference characters and illustrate an embodiment of my invention.

Figure 6:
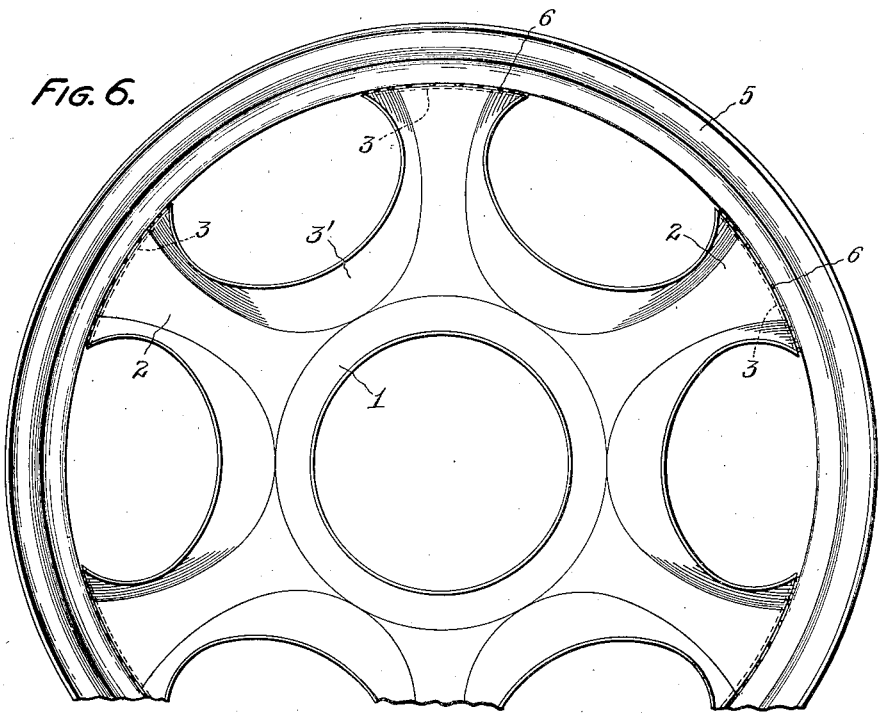
Fig. 6 is a view in plan of the assembled spoke unit and rim before welding.
Figure 7:
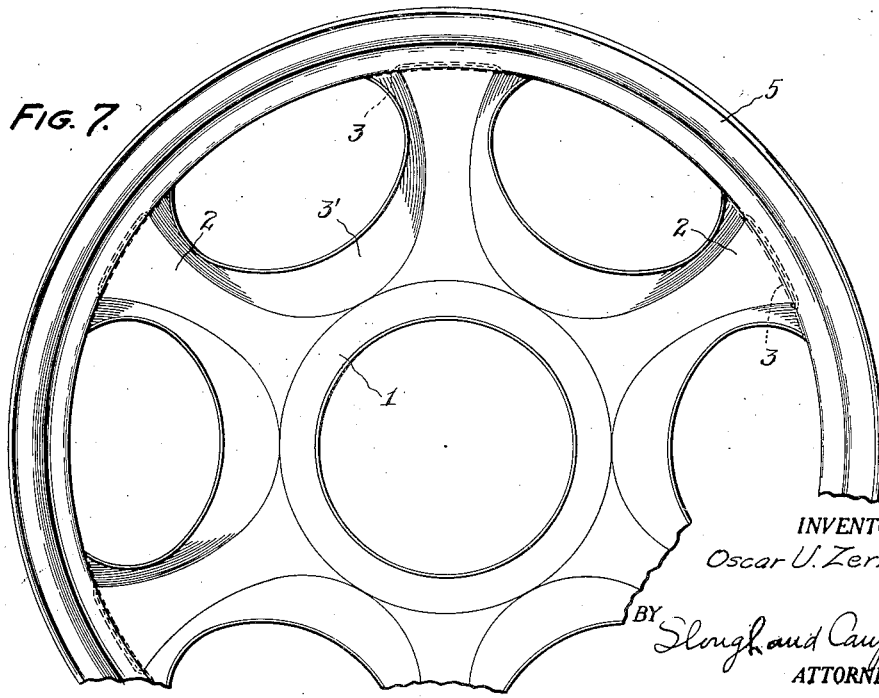
Fig. 7 is a view similar to Fig. 6, showing the rim and spoke unit welded together.
Figure 8:
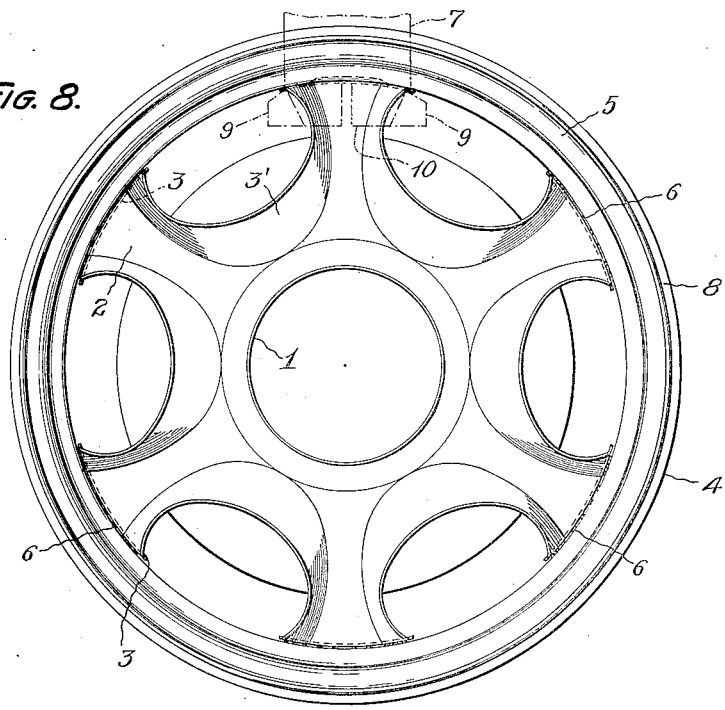
Fig. 8 is a plan view showing a single welding tool applied to weld one spoke to the rim at a time.
Figure 9:
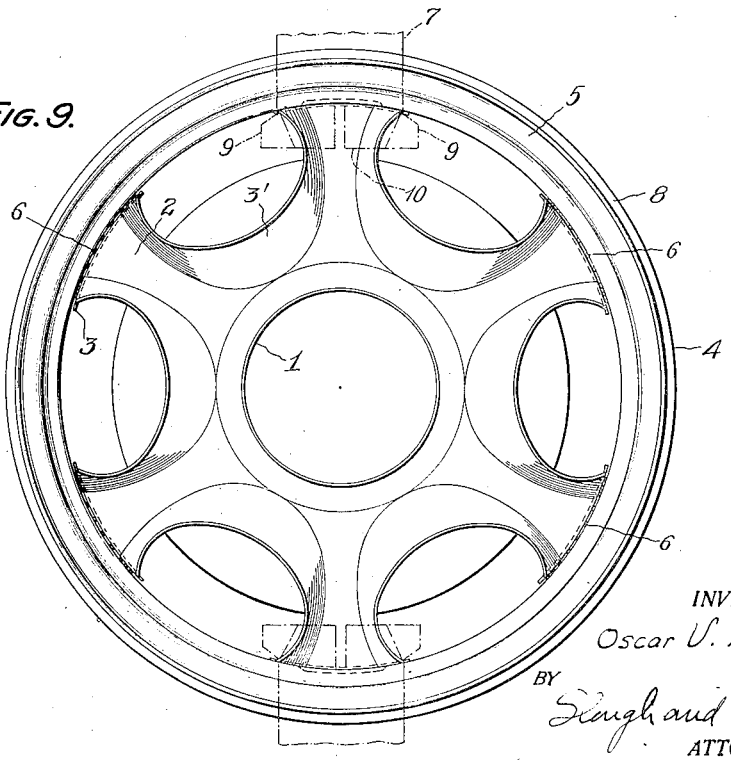
Fig. 9 is a view similar to Fig. 8, showing the rim and spoke unit being welded together at two points simultaneously.

According to my invention, a piece of sheet metal is formed by drawing or in any other suitable manner into a single pieced spoke unit such as shown at 1 in Fig. 1 of the drawings. The spoke unit 1 is formed with a plurality of spokes 2.

In order that the spoke unit as a whole and the spoke portions thereof may have the necessary strength for the use for which the unit is intended and at the same time to provide sufficient resiliency to be adaptable to the method of my invention, I form the spoke portions 2 of a suitable shape such as a U channel shape, illustrated in the drawings, or a similar shape having the metal in a plurality of planes. The spokes 2 thus formed have considerable rigidity affording sufficient strength for the finished wheel and at the same time, due to the construction of the spokes 2 and their relative arrangement in the spoke unit, the spoke unit as a whole can be deformed so as to reduce the external diameter of the spoke unit as much as a quarter of an inch.

In order to provide suitable surfaces upon the ends of the spokes for welding, the metal thereof at the marginal portion of the spoke end is turned over as indicated at 3 in Fig. 1 of the drawings. Alternatively, the turned over portion 3 of the end of the spoke may be arranged inwardly instead of outwardly of the spoke. The metal of the spoke unit 1 between the spokes 2 is drawn inwardly of the unit to form a portion 3 for a purpose later to be described.

In order to properly position and hold the spoke unit 1 during the assembling operation, a support 4 into which the spoke unit 1 fits is provided. When the spoke unit 1 is in unsprung condition, it fits the support 4 smoothly throughout the faces of contact.

The rim 5 of the wheel is made of a diameter slightly smaller than the external diameter of the spoke unit. In assembling the rim 5 upon the spoke unit 1, it is placed over the spoke unit as shown in Fig. 2 manually or in any other suitable manner. As the rim is dropped downwardly over the spoke unit into a position such as shown in Fig. 3, it frictionally engages the ends of the spokes, the rim being arranged so that the ends of the spokes are adjacent to those portions of the rim formed with projections 6. In order to complete the assembly operation, the rim 5 is forced downwardly by a suitable press until the lower edge of the rim 5 rests upon the surface 8 of the support 4. During this operation, the ends of the spokes 2 spring inwardly until the margin 3 of the spoke ends rest upon the ends of the projections 6 formed on the inner surface of the rim. Due to the sprung condition of the spoke unit, the spoke unit exerts a compressional force to the marginal portion 3 of the ends of the spokes against the projections 6 formed in the rim.

The construction of the support 4 is such that when the rim 5 rests upon the surface 8 of the support and the spoke portion 2 is forced against its supporting portion, the rim 5 and spoke portion 1 are held in proper relative alignment.

In order to effect a welding operation, a welding tool 7 is brought downwardly and moved radially inwardly of the rim until it comes in contact with the said portion thereof in which the projections 6 are formed, as shown in Fig. 4. Simultaneously, welding tools 9 are lowered within the rim and between the spokes, then moved circumferentially and upwardly until the portion 10 of the electrode 9 is brought into engagement with the back of the margin 3 formed on the ends of the spokes 2, (see Fig. 4).

When the electrodes 7 and 9 are brought into contact with the rim 5 and margin 3 respectively, the welding operation takes place, the metal being under pressure at the time due to the sprung condition of the spoke unit 1.

Due to the sprung condition of the spoke unit which holds the spoke unit in proper place and at the same time applies pressure individually to the various areas of contact between the spoke ends and the rim, it is possible to weld one spoke at a time, or two spokes simultaneously, or three spokes simultaneously, or all of the spokes simultaneously as illustrated in Figs. 8, 9, 10, and 11 respectively.

Due to the fact that the spoke portion is of larger outside diameter than the internal diameter of the rim, the spoke portion remains in sprung condition even after the welding operation has been completed, which causes the metal of the projections to flow and merge into the rim.

Due to the fact that the spoke portion is under compression after the welding operation is completed, the welded joints are held under compression during the use of the wheel so that the strain upon the welded joints is reduced.

As shown in Figs. 4 and 13, the welding tools 7 and 9 are projected perpendicularly against the surfaces to which they are applied. Where the flange 3 formed on the extremity of the spokes 2 is turned outwardly, the tool 9 is applied as illustrated in Fig. 13. Where, however, the flange 3 is turned inwardly as illustrated in Fig. 15, the welding tool 9 is applied as illustrated in Fig. 16. Fig. 14 illustrates the points of contact 6' of the margin 3 with the projections 6 formed in the rim at the point marked by crosses on Fig. 14.

As illustrated in Fig. 13, the surfaces of the welding electrodes are smaller in area than the area to be welded and are made of a hard metal so that the heat will be intensified at the welding point whereby the weld will be complete over the entire area.

To the assembled rim and spoke unit is next added the wheel attaching flange. With the rim and spoke unit still resting upon the support 4, the wheel attaching flange 11 is inserted in place as shown in Fig. 17. The wheel attaching flange is a cup-shaped piece of sheet metal formed by drawing or in any other suitable manner. The wheel attaching flange 11 is provided with bolt holes 12 or other suitable means by which the flange may be attached to the axle of the automobile. In order that the wheel attaching flange 11 may be secured to the spoke unit, it is formed in a conical form adapted to fit into the cone-like portion of the spoke unit made up of the portions 3' of the spoke unit.

The wheel attaching flange 11 is provided at intervals about its periphery with portions 13 shaped to mate with the surface of the portions 3' of the spoke unit. In order to insure good electrical contact for the welding operation over a large area, projections are formed in the metal of the portion 15 of the wheel attaching flange 11. The projections 14 extend vertically from the metal of the portion 13 and engage the surface of the metal of portions 3' at right angles to the plane of the point of contact. Those projections 14 which are most distant from the axis of the wheel attaching flange 11 are the larger while those projections 14 which are nearer the axis of the wheel attaching flange 11 are smaller.

When the wheel attaching flange 11 is placed within the conical portion of the spoke unit 1, the larger projections 14 rest against the surface of the metal of the portions 3' of the spoke unit while the smaller of the projections 14 are spaced from the metal of the spoke unit.

In order to bring the projections of the wheel attaching flange uniformly into engagement with the surface of the metal of the spoke unit, the wheel attaching flange 11 is forced downwardly by a press element 15 engaging the inner surface of the wheel attaching flange 11 as shown in Fig. 18. When the wheel attaching flange 11 is pressed downwardly as shown in Fig. 18, the conical portion of the spoke unit is sprung outwardly, while the upper portion of the wheel attaching flange is sprung inwardly thereby forcing the shorter projections 14 of the wheel attaching flange into engagement with the surface of the metal of the spoke unit.

In this manner, a uniform pressure is applied over the various projections 14 onto the surface of the metal of the portions 3' of the spoke unit, insuring a good and uniform electrical contact throughout the welding area. The plane of the bottom surface 16 of the pressure element 15 is parallel with the surface 8 of the support 4 so that, when the wheel attaching flange 11 is pressed into place, it is arranged in proper alignment relative to the rim 5 so that the wheel will run true when placed upon the axle of the car.

While the wheel attaching flange 11 is held in position by the pressure element 15, welding electrodes 17 and 18 are lowered into juxtaposition with the metal of the parts to be welded, and then moved radially toward those parts until brought in contact therewith.

When the electrodes 17 and 18 contact with the metal, the welding operation is effected. The area of contact of the electrodes is smaller than the area to be welded so that a concentration of heat is effected thereby insuring a good welding joint.

The metal at the inner face of the welding surfaces is under compression due to the pressure exerted upon the wheel attaching flange 11 by the element 15. The welding operation upon the wheel attaching flange and spoke unit may be formed one at a time or all of the welding areas may be welded simultaneously.

The finished wheel after the last welding operation is a unit of adequate strength with the parts thereof securely united by thoroughly welded joints over a large area. Thus a wheel formed on the minimum of parts with a minimum of operations, the operations being most effectively used in order to attain the maximum strength and serviceability in the cost of the wheel and the wheel as a whole.

While the method of assembling the wheel has been described as first uniting the spoke unit and the rim, and secondly the wheel attaching flange and spoke unit, the reverse of the operations may be performed within the scope of this invention.

Figures 23, 24, 25:
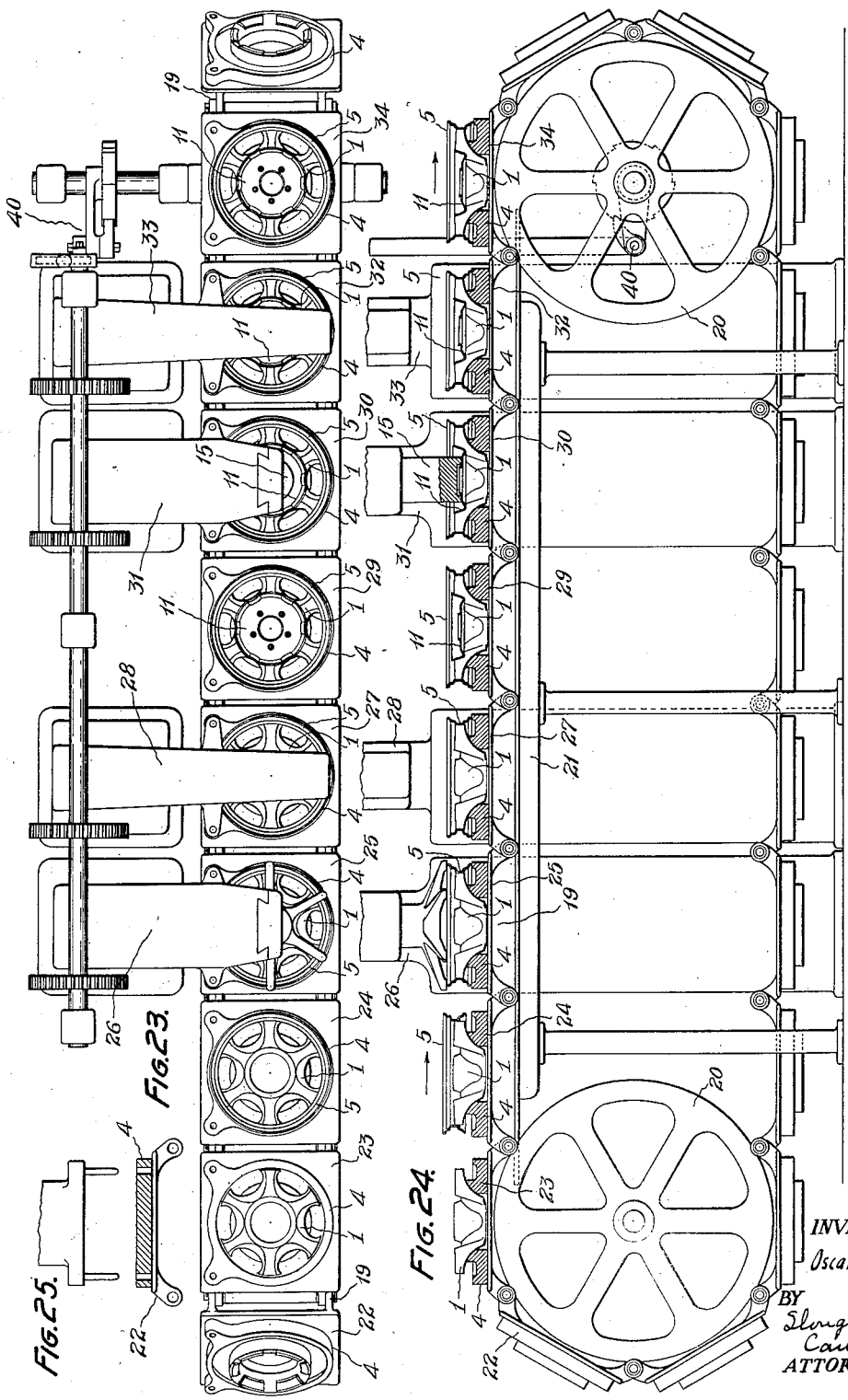
Fig. 23 is a diagrammatic view illustrating mechanism for continuously carrying out the process of my invention.
Fig. 24 is a view in elevation of the mechanism shown in Fig. 23.
Fig. 25 is a detail view illustrating the operation of the machine of Fig. 23.

In Figs. 23 to 25 is shown equipment for carrying out the above described process by machinery. As shown in those figures, a conveyor chain 19 is advanced by wheels 20, one of which may be driven in any suitable manner as by means of the reciprocating ratchet mechanism 40. The upper span of the chain 19 passes over a supporting table 21. The conveyor chain 19 has connected therewith supporting elements 4 which are advanced step by step from machine to machine during the progress of the assembling operation. In Fig. 23, the supports 4 are shown as advancing from the left end of the table, being carried on table elements 22.

To the right of the element 22 is shown a spoke unit 1 positioned on the support 4. Upon the next succeeding element 24, the rim 5 is arranged over the spoke unit 1. The spoke unit 1 and the rim 5 may be placed in position either manually or by suitable mechanism, not shown. As indicated at 25, a press 26 operates to force the rim 5 downwardly over the spoke unit in order to completely assemble these parts as hereinbefore described. As indicated at position 27, a welding unit 28 effects the welding of the spoke unit and the rim. As indicated at position 29, a wheel attaching flange 11 is placed in position with the associated spoke unit and rim. As indicated in position 30, the wheel attaching flange 11 is pressed home by the press 31. As indicated at station 32, the wheel attaching flange is welded to the spoke unit by the welding equipment 33. Position 34 indicates the completed wheel which is then removed from the conveyor.

Although this invention has been described by way of illustration, it is not intended to limit the invention to the details herein disclosed upon which many modifications and changes may be made by those skilled in the art within the scope of my invention which is defined by the following claims.

I claim:

1. In the manufacture of wheels, the method comprising the formation of a wheel body consisting of a unitary stamping having an outer hub portion and having spokes extending radially outwardly thereof with the spoke outer faces axially inclined from the hub portion toward the spoke ends and with the wheel body resiliently radially contractible, pressing the wheel body within a rim of smaller internal diameter than the external diameter of the spoke portion by exerting oppositely directed pressure on the rim and the spoke outer faces, thereby forcing the spokes radially inwardly whereby the spokes exert radially outwardly directed pressure against the inner periphery of the rim and then passing an electric welding current through the rim and the engaged portion of the spoke ends to form a welded joint between the spoke ends and the rim.

2. In the manufacture of wheels, the method comprising the formation of a wheel body consisting of a unitary stamping having an outer hub portion and having spokes extending radially outwardly thereof with the spoke outer faces inclining generally axially outwardly from the spoke ends toward the hub portion and with the wheel body resiliently radially contractible, pressing the wheel body within a rim of smaller internal diameter than the external diameter of the spoke portion by exerting oppositely directed pressure on the rim and the spoke outer faces, thereby forcing the spokes radially inwardly whereby the spokes exert radially outwardly directed pressure against the inner periphery of the rim and then passing an electric welding current through the rim and the engaged portion of the spoke ends to form a welded joint between the spoke ends and the rim, and simultaneously welding the spoke ends to the rim.

3. In the manufacture of wheels, the method comprising the formation of a wheel body consisting of a unitary stamping having an outer hub portion and having channel shaped spokes extending radially outwardly thereof, the axially outer wall of each of the spokes flaring axially outwardly and radially inwardly throughout a substantial portion of its length, pressing the wheel body within a rim of smaller internal diameter than the external diameter of the spoke portion, the wheel body being supported on the axially outwardly flaring walls during the pressing operation, the spokes being forced radially inwardly, whereby, on release of the axially directed force employed to press the wheel body in the rim, the spokes exert radially outwardly directed pressure against the inner periphery of the rim, and then passing an electric current through the rim and the engaged portions of the spoke ends to form a welded joint between the spoke ends and the rim.

4. In the manufacture of wheels, the method comprising the formation of a wheel body consisting of a spoke bearing nave portion having spokes extending radially outwardly thereof with the spoke outer faces inclining generally axially outwardly from the spoke ends to the nave portion and with the wheel body resiliently radially contractible, pressing the wheel body within a rim of smaller internal diameter than the external diameter of the wheel body by exerting oppositely directed force on the rim and the said spoke outer faces, thereby forcing the spokes radially inwardly whereby the spokes exert radially outwardly directed pressure against the inner periphery of the rim, and the ends of the spokes engage the rim through previously formed spaced radially extending heat conducting projections on one of said engaging portions, then passing an electric welding current through the rim and the engaged portion of the spoke ends, whereby the previously formed radially extending heat conducting projections are melted and the wheel body expands, the spokes moving radially outwardly to compensate for the elimination of the heat conducting projections.

5. In the manufacture of wheels, the method comprising the formation of a wheel body consisting of a spoke bearing nave portion having a plurality of spokes extending radially outwardly therefrom with the spoke outer faces inclining axially inwardly from the nave portion to the spoke ends and with the wheel body resiliently radially contractible, positioning the wheel body within a rim provided with previously formed spaced radially extending heat conducting projections arranged to be engaged by the radially outer ends of the spokes, maintaining the wheel body with the spokes exerting radially outwardly directed pressure against the radially inwardly extending heat conducting projections by applying oppositely directed pressure on the spoke end portions and the said outer faces, then passing an electric welding current through the rim and the engaged portions of the spoke ends, whereby the previously formed heat conducting projections are melted and the spokes move radially outwardly to compensate for the elimination of the heat conducting projections.

6. In the manufacture of wheels, the method comprising the formation of a wheel body consisting of a spoke bearing nave portion having spokes extending radially outwardly thereof with the spoke outer faces inclining axially outwardly from the spoke ends to the nave portion, pressing the wheel body within a rim of smaller internal diameter than the external diameter of the wheel body by exerting oppositely directed pressure on the rim and the said spoke outer faces, the rim being provided with previously formed spaced radially extending heat conducting projections arranged to be engaged by the radially outer ends of the spokes, thereby forcing the spokes radially inwardly whereby the spokes exert radially outwardly directed pressure against the radially inwardly extending projections on the rim, then passing an electric welding current through the rim and the engaged portions of the spoke ends whereby the previously formed radially extending heat conducting projections are melted and the wheel body expands the spokes moving radially outwardly to compensate for the elimination of the heat conducting projections.

7. In the manufacture of wheels, the method comprising the formation of a wheel body consisting of a spoke bearing nave portion having a plurality of spokes extending radially outwardly therefrom with the spoke outer faces inclining generally axially outwardly from the spoke ends to the nave portion, positioning the wheel body within a rim by directing pressure in opposite directions on the rim and the said spoke outer faces, the radially outer ends of the spokes and the inner face of the rim engaging through previously formed spaced heat conducting projections on one of said members maintaining the wheel body with the spokes, the spoke ends exerting radially outwardly directed pressure against the rim, then passing an electric welding current through the rim and the engaged portion of the spoke ends to form a welded joint between the spoke ends and the rim, the spokes moving radially outwardly to compensate for the elimination of the radially extending heat conducting projections.

OSCAR U. ZERK.